United States Patent [19]

Stockham, Jr. et al.

[11] 4,328,580

[45] May 4, 1982

[54] APPARATUS AND AN IMPROVED METHOD FOR PROCESSING OF DIGITAL INFORMATION

[75] Inventors: Thomas G. Stockham, Jr.; Bruce C. Rothaar, both of Salt Lake City, Utah

[73] Assignee: Soundstream, Inc., Salt Lake City, Utah

[21] Appl. No.: 55,689

[22] Filed: Jul. 6, 1979

[51] Int. Cl.³ ............................................ G06F 11/20
[52] U.S. Cl. ........................................ 371/8; 360/38; 360/47; 371/65; 371/68
[58] Field of Search ............... 371/68, 8, 65; 360/47, 360/38, 53

[56] References Cited

U.S. PATENT DOCUMENTS

| | | | |
|---|---|---|---|
| 3,078,448 | 2/1963 | O'Brien | 371/68 |
| 3,264,623 | 8/1966 | Gabor | 371/68 |
| 3,281,804 | 10/1966 | Dirks | 371/68 |
| 3,303,482 | 2/1967 | Jenkins | 371/68 |
| 3,633,162 | 1/1972 | Findeisen | 371/68 |
| 3,665,430 | 5/1972 | Hinrichs et al. | 371/68 |
| 3,761,903 | 9/1973 | Bird, Jr. et al. | 371/68 |
| 4,202,018 | 5/1980 | Stockham, Jr. | 360/47 |

Primary Examiner—Charles E. Atkinson
Attorney, Agent, or Firm—M. Reid Russell

[57] ABSTRACT

The present invention involves an apparatus and method for processing of digital information that includes duplication of information from each channel of a multi-channel recorder on main and backup tracks and provides a combination of error detection apparatus and procedures where data groupings or words on each track are individually subject to four separate tests for detecting errors and provides, from that analysis, for a selection of most likely correct data for further processing. Additionally, further system reliability is obtained by providing circuitry whereby a detected error activates a selection of data groupings coming before and after the detected error, providing where appropriate, for switching from main to backup track data over a certain number of data groupings. The present invention further provides a unique synchronization coding format with circuitry and a procedure for its use for rapidly acquiring synchronization coding in a data flow and includes an arrangement for averaging the content of first-in-first-out buffers of each track for controlling tape speed to enable a smooth over-dubbing of information recorded at different times on separate tracks.

15 Claims, 9 Drawing Figures

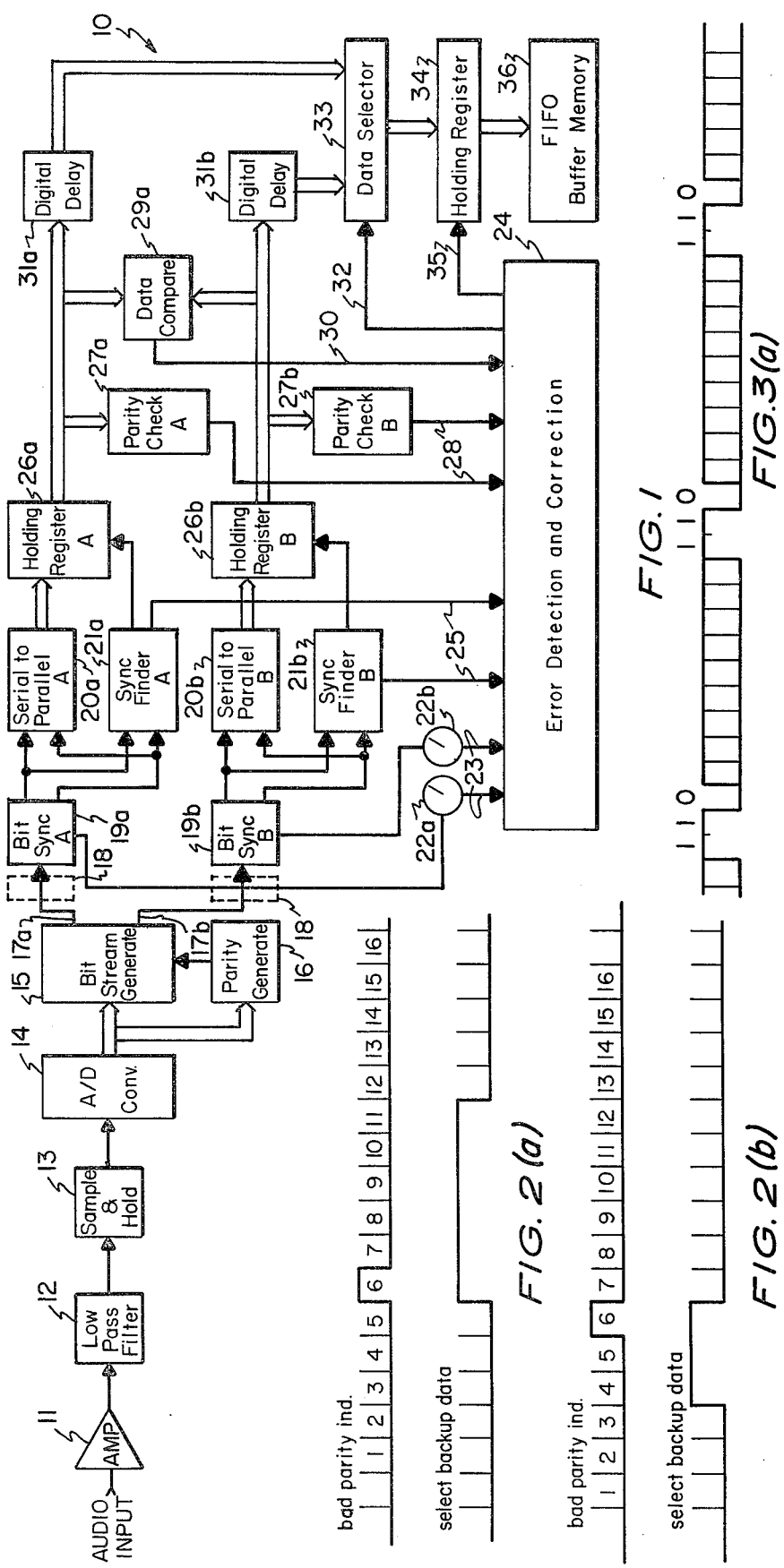

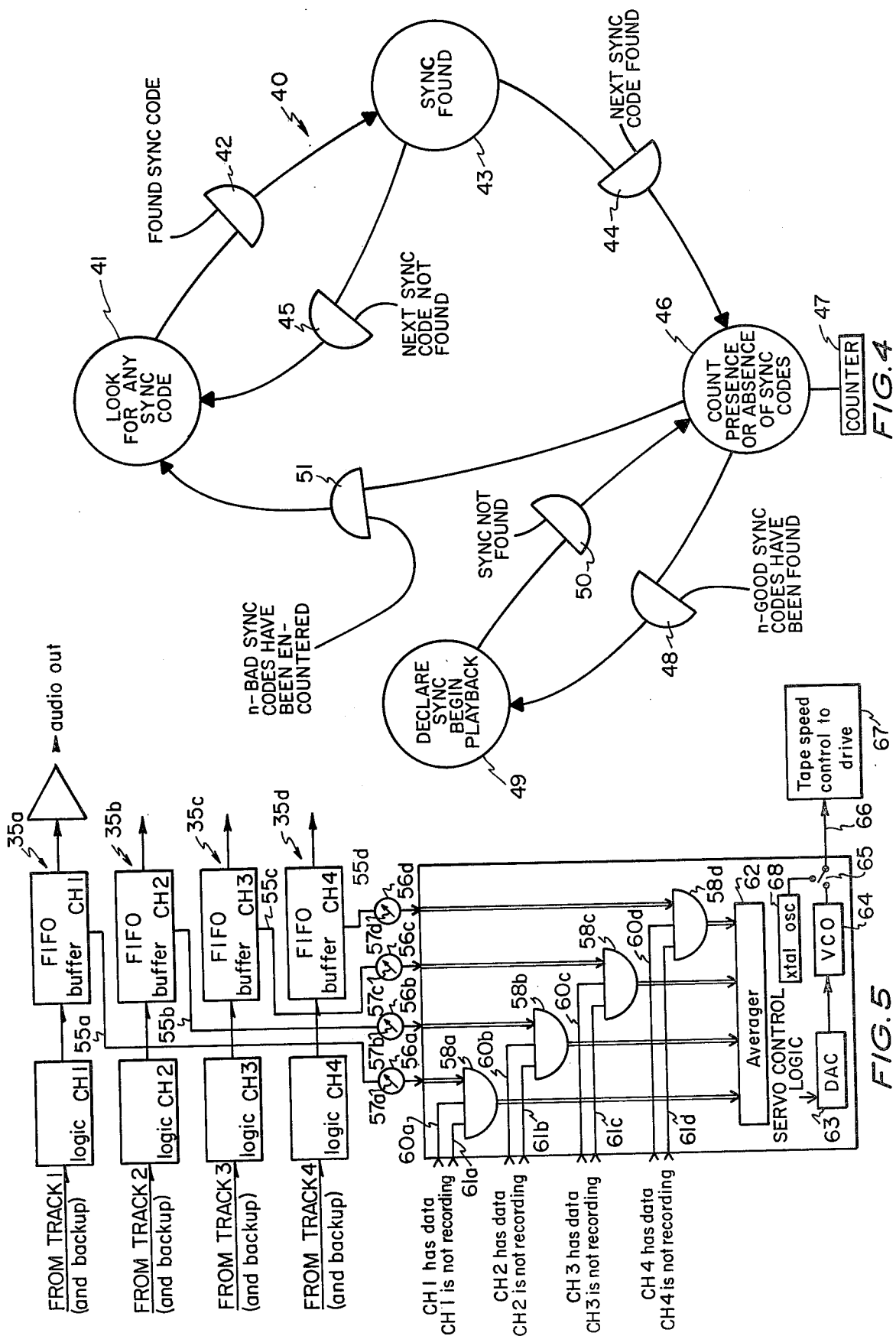

APPARATUS AND AN IMPROVED METHOD FOR PROCESSING OF DIGITAL INFORMATION

BRIEF DESCRIPTION OF THE INVENTION

1. Field of the Invention

This invention relates to apparatus and methods for conversion of analog information into digital format and includes error detection/correction techniques and data analysis schemes that provide for recording redundant information to minimize a fatal dropout of information.

2. Background of the Invention

The present invention involves apparatus for performing digital recording of analog information and is particularly suited to reproduction of audio information. In such digital recording, dependent upon the recording medium used, as for example, a magnetic tape, and taking into account the mechanical imperfections in recording apparatus, it is often the case that information can be lost in the recording and retrieval process. Such information loss has, in the past, generally required an averaging between good data or a picking up and reproducing of last good data, or the like, to fill a gap or space left when a loss occurs.

That some information will be lost is a statistical probability that increases with equipment age, magnetic tape wear, and like factors, and so must be planned for to achieve a most faithful reproduction possible. As will be outlined hereinafter, a number of techniques and schemes have been proposed and implemented for reducing information losses. An apparatus and a method for providing a faithful information reproduction was disclosed in an earlier United States Patent Application entitled, "Apparatus and Method For Providing Error Recognition and Correction of Recorded Digital Information", invented by one of the present inventors, filed Sept. 27, 1978, and now U.S. Pat. No. 4,202,018 issued May 6, 1980. The present invention preferably includes certain of the circuitry and error detection/correction techniques disclosed in that earlier application for United States Patent, but expands therefrom to provide a more accurate and faithful data reproduction than was heretofore achieved.

3. Prior Art

As detailed in the above-cited earlier United States Patent Application entitled, "Apparatus and Method for Providing Error Recognition and Correction of Recorded Digital Information", there are numerous advantages to reproducing audio information into a digital form. Such digital form, of course, consists of numerical representations of increments of a fluctuating analog signal, and lends itself to alteration by simple numeric additions or subtractions. A digital format therefore, simplifies signal filtering, and like operations. However, the medium on which the data is recorded is subject to defect and even the machinery for performing that recording is not error-free. Therefore, to produce the highest quality of reproduction where a large number of bits of information are processed each second, it is necessary to be able to identify, for reproduction, the most likely correct information. The present invention preferably incorporates a full reproduction of primary data on a backup track, and recognizes that such exact reproduction and substitution, where appropriate, of backup for primary data on discovery of an error, is not in itself new. Such is well known in the art and is shown in patents by Dirks, U.S. Pat. No. 3,281,804, and Hendrichs, et al, U.S. Pat. No. 3,665,430. However, the particular error detection tests and correction techniques employed by the present invention to command substitution of backup track data for main track data is not shown in either of these prior patents nor, to the knowledge of the present inventors, has such been known before.

Within the redundant recording scheme of the present invention, it is necessary to provide for an accurate determination of which information to select as being correct or most likely correct for further processing. The aforesaid United States Application for Patent provides three independent information checking techniques for application to each data group or data word. Specifically, this prior patent application involves checking, in each data group for sync coding and parity, and includes checking for an information match between main and backup track data groups. The present invention additional thereto and unique within the knowledge of the inventors, also makes an assessment of signal quality for each data group recorded on both the tracks and compares signal qualities such as: track signal amplitude where a drop in amplitude would indicate a tape dropout; proper location of track signal axis crossings where improper crossings could indicate tape dropouts or signal phase anomalies indicative of excessive head wear or misaligned tape playback equilization; and number of axis crossings where insufficient crossings can cause a bit synchronizer to lose count of bit periods. Signal quality is evaluated as an indicator of the possible presence of an error. In practice, it has been found that where there is a signal quality fluctuation on a track the probability is increased that the data on that track, proximate to that signal fluctuation, will be suspect or unreliable. Therefore, the present invention adds to the three criterion of the earlier patent application a comparison of signal qualities between main and backup track data groups. Of course, once an error is detected, then a determination of the most likely correct data is made and a substitution of backup track for main track information is made. While a signal strength evaluation has been shown in an earlier United States Patent by Gabor, U.S. Pat. No. 3,264,623, such signal monitoring was to provide for switching from one track to the other on signal loss only. The present invention, unlike this earlier patent, compares signal quality, as described above, with a difference between main and backup track information evaluated as an element in the error detection process and does not require a complete signal loss to declare that information suspect.

Prior art devices known to the present inventors, including the present inventor's aforementioned application for United States Patent, have all involved looking at information only as it passes a certain point or location whereat a decision has to be made to select main or backup information or integrate between data. This, of course, means that each data grouping on each main and backup track for each channel is evaluated separately to determine which is most likely correct information for further processing. Since no error detection process can guarantee perfect detection of bad data, to further improve the accuracy of the error detection process of the present invention, it is useful, when bad data is detected to declare the data coming before and thereafter as being suspect and to therefore utilize the other track data. Specifically, and unique from the prior art within the knowledge of the present inventors, the present invention provides circuitry and procedure for looking behind and looking ahead in main and backup track data flows. Thereby, when an error is detected that requires a selection of the other track data, that selection will include a number of data groupings before and after the bad data grouping.

Additional to the error detection/correction schemes and look-behind and look-ahead scheme outlined hereinabove and unique within the knowledge of the inventors, the present invention further includes a new synchronization code format and a system for more rapidly and accurately locating and locking into synchronization coding to prevent a premature declaration of synchronization, particularly upon startup. Further, the present invention provides for synchronizing of data on separate tracks recorded independently and at different times, whereby time differences are averaged to simplify overdubbing of one track over another, which arrangement is also believed to be unique.

Within the knowledge of the inventors, there has not heretofore existed apparatus and a method like that of the present invention to include the particular error detection system and techniques for selection of data for further processing, synchronization format and arrangement for acquisition of synchronization codes and track synchronization techniques, which apparatus and methods are believed to be new and unique and a significant improvement in the art.

It is a principal object of the present invention to provide an improved method for error detection of digital data recorded on main and backup tracks, and to provide criterion for selection of the most likely correct information on main or backup tracks for further processing.

Another object of the present invention is to provide apparatus and a method for looking ahead and looking behind in a data flow on each track whereby a detected error will cause the data coming before and after to be deemed to be suspect, commanding a selection of the other track data over that period to improve the accuracy of the error detection/correction processes.

Another object of the present invention is to provide a recording format that includes an alternating synchronization code format that facilitates identification thereof from the other content of data groups or words for preventing a premature declaration of synchronization.

Still another object of the present invention is to provide circuitry for rapidly acquiring synchronization, particularly at startup, that includes an arrangement wherein acquired synchronization codes and the spacing therebetween are checked for a number of data groups or words before synchronization is declared.

Still another object of the present invention is to provide appropriate circuitry and a scheme for its use for controlling the speed of travel of a tape whereon two tracks of data are recorded, such that data recorded on different tracks at different times can be synchronized together for providing a smooth over-dubbing and synchronized playback of finished analog signals.

Principal features of the present invention in an apparatus and method include a recording apparatus wherein analog signals are converted to a digital form for permanent recording on an appropriate medium, such as a magnetic tape. Preferably, the present invention provides for duplication of recorded data by recording for each channel of a multi-channel recorder the same data on main and backup tracks. The two data flows consist of data words, preferably, of sixteen bits of information and a parity bit and three synchronization code bits therewith. The present invention provides error detection circuitry whereby each data word on each track is subjected to four tests for determining which main or backup track information is most likely correct, with, when main track data is deemed to be correct, it is passed automatically. The four error detection tests of the present invention include: checking for the presence of proper parity and synchronization codes in each data word; determining if a match exists between the main and backup track data words; and checking for a variation in signal quality between main and backup track data word flows. Such signal quality analysis can include sensing: a track signal amplitude change that could indicate a dropout; proper location of track signal axis crossing where an improper crossing could indicate a tape dropout or signal phase anomalies indicative of excessive head wear or misaligned tape playback equalization; number of axis crossings where insufficient crossings can cause a bit synchronizer to lose count of bit periods; or the like. While such signal quality variation or fluctuation will not necessarily indicate the presence of an error, it has been found in practice that such fluctuations often accompany a problem with recorded data. Therefore, for example, if the signal strength is found to be weak on the main track, and problems exist with parity, sync coding, or there is a data mis-match between the main and backup track information, then the backup track information would be selected for reproduction, and vice versa. The system of the present invention preferably provides that a signal quality variation or fluctuation without the presence of another error or errors will be ignored. Therefore, a signal quality variation or fluctuation is used as a "tie-breaker", to further add to the accuracy of the error detection capabilities of the present invention.

In practice it has been found, particularly where a constant audio signal is introduced, that the signal itself may periodically reproduce the synchronization coding. Such false code could then be picked up as a synchronization code or sync code, the playback thereby "locking up" improperly out of synchronization. To avoid this potential difficulty, the present invention, preferably, alternates each sync code in each data word, as say from 110 in a first data group or word to 001 in a following data group or word, and so on. So arranged, the playback would pickup a first sync code found, look over a proper number of bits thereafter in a following data group and then look for an alternated sync code, and so on. Alternating sync coding minimizes a possibility that a signal in a data group or word could be sensed as sync code.

As an additional error minimizing procedure, the present invention provides circuitry for looking ahead and looking behind or back in the data flow on each track. Specifically, looking ahead involves an introduction of a delay into the data flow whereby the four error detection tests are performed on each data word prior to that data word arriving at a point in the circuitry where a decision to playback main or select backup track data needs to be made. From the results of the four tests outlined hereinabove, an error determination results in identifying a number of data words ahead of and a certain number of data words behind the error in the flow as being suspect. Therefore, where the error is in the main track, data words will be picked up for playback from the backup track before and after the error. So arranged, error trends occurring on one track, are anticipated and provided for by this look-ahead/look-behind feature of the present invention.

Additional to the described alternating synchronization coding, the present invention, to lock onto proper spacing between data words as soon as possible during playback, provides synchronization engine circuitry. This circuitry can be described as operating in essentially four states and is particularly useful at startup, to locate synchronization codes and spacing therebetween in the data flows. In operation, the synchronization engine looks in a data flow at startup for any sync code and, when such sync code is found, counts ahead to where the next sync code should be. If a proper sync code is found thereat again the circuitry counts ahead to where the next sync code should be, continuing looking in the data flow until a certain number (n) of properly located sync codes are discovered whereat synchronization is declared and normal playback is ordered. However, if sync codes are not located where they should be in the data flow, then such failures are subtracted from successes until either (n) successes are found or a total of successes less failures reaches zero whereat the circuitry returns to the first state of looking for any sync code. This circuitry and its functioning provides for a more positive location of synchronization within the shortest period of time possible so as to prevent declaring synchronization prematurely and creating thereby unwanted noise.

Additional to the detection techniques, synchronization code format, and synchronization engine circuitry outlined hereinabove, the present invention also includes an arrangement for averaging tape speeds between tracks such that information recorded on one track, can be synchronized with information on another and over-dubbed thereover. The circuitry arrangement to perform this data matching provides for averaging of tape speed whereby first-in-first-out buffer circuit for each audio channel is maintained at a certain desired level of fullness as compared or averaged with other channel buffer circuits so as to compensate for the effects of wow and flutter across the tracks.

Other features, objects and steps in practicing the present invention will become more apparent from the following detailed description, taken together with the accompanying drawings.

THE DRAWINGS

FIG. 1, is a block schematic of a single channel of a multi-channel digital tape recorder, that should be understood to receive data, in the form of an analog signal, to process and convert that signal to digital form and to record in duplicate, that information on two tracks, the Figure showing inputs, and circuitry associated with the data conversion, recording, error detection/correction and playback and further shows, in schematic, circuitry to perform look-behind and look-ahead schemes of the present invention;

FIG. 2(a), shows a schematic of a flow of main track data words 1 through 16, with data word 6 identified as containing a bad parity indicator that results in generation of a command to thereafter select data on a backup track which command is shown therein to continue for a number of following data words illustrating a look-behind scheme of the present invention;

FIG. 2(b), shows a schematic of the flow of main track data words of FIG. 2(a), showing the same error indication in block 6, which block 6 error is shown sensed before block 6 arrives at a point in the flow where a selection decision is required, resulting in a command to select backup track data for a number of data words prior to the error indication, illustrating a look-ahead scheme of the present invention;

FIG. 2(c), shows a combination of the flows of FIGS. 2(a) and 2(b);

FIG. 3(a), a schematic representation of a signal train of data words arranged between conventional synchronization codes;

FIG. 3(b), a schematic like that of FIG. 3(a) only showing what appears to be a synchronization code within a data word;

FIG. 3(c), a schematic like that of FIGS. 3(a) and 3(b) only showing alternating synchronization codes arranged between each data word;

FIG. 4, a block schematic function flow of synchronization engine circuitry of the present invention; and FIG. 5, a block schematic of first-in-first-out buffer memory circuits of a four channel unit that are connected so as to pass, when filled appropriately, signals that control tape speed whereby tracks recorded at different tapes can be synchronized in over-dubbing operations.

DETAILED DESCRIPTION

Referring now to the drawings

In FIG. 1, is shown a block schematic that illustrates a signal flow through a single channel 10 that should be understood to be one channel of a multiple channel digital tape recorder of the present invention. The single channel 10 shown in FIG. 1 is representative of each channel of such multi-channel digital tape recorder, which digital tape recorder is preferably arranged to involve a non-return to zero (NRZ) recording.

In the schematic of FIG. 1 the blocks shown and identified therein should be understood to be indicative of standard electrical circuits and, as appropriate, are essentially like the circuits shown and described in the application for United States Patent entitled "Apparatus and Method for Providing Error Recognition and Correction of Recorded Digital Information", U.S. Pat. No. 4,202,018, cited earlier herein.

The present invention includes a combination of circuitry that together function uniquely, as will be described, and so specific electrical components within a block of circuitry, their connections, and individual operations, except where appropriate, will not be shown in detail herein.

In the single channel 10 schematic of FIG. 1, reading from left to right therein, an audio input is shown passed into an amplifier 11. It should however be understood that any analog signal input would be appropriate for processing within and by the present invention. For purposes of this disclosure the signal input will be assumed to be an audio signal as from a musical performance. The amplifier 11 conventionally increases the strength of the received signal and passes it to a low pass filter 12 wherein frequencies above so called Niquist Frequency are filtered out. Such signal filtration is to prevent aliasing in the sample and hold and analog to digital conversion circuitry to follow.

From the low pass filter 12 the signal passes to a sample and hold circuit 13 wherein is contained a clock, not shown, that is part of a record control to provide clocking pulses that are imposed upon the input signals and function as timing pulses to control the operation of an analog to digital converter circuit that is shown in FIG. 1 and hereinafter referred to as an A/D converter 14. In A/D converter 14, under the control of the clocking pulses, the analog signal is converted to digital form; preferably increments of the analog signal are represented as 16-bit data words, and each data word is fed, at intervals, simultaneously into a bit stream generator 15 and into a parity generator 16. The bit stream generator 15 rearranges the parallel data words into a serial configuration and synchronization or sync codes arc includes therewith. A parity bit is included therein by parity generator 16 and the bit stream generator 15 duplicates each data word for simultaneous recording on main and backup tracks. The data words with parity and sync codes therein from the bit stream generator 15 travel, as shown, through lines 17a and 17b to a conventional recorder, not shown, that records the serial information, as main and backup track flows, onto a permanent media. The permanent media, as shown in FIG. 1 as broken line boxes, is preferably magnetic tape 18.

So arranged, the main and backup track data flows are recorded on magnetic tape 18 alongside one another and spaced apart such that a data loss on one track, as with a tape defect, or the like, will not necessarily extend to the other track. As will be more fully discussed later herein, a loss of data, error, or the like, occurring on the main track will cause or trigger a switching of the playback to the backup track and, of course, if a problem occurs with the backup track, the main track data will continue to be passed for playback. So arranged, a loss on one track only will not result in an unrecoverable loss of information.

Shown in FIG. 1, serial information is taken off from magnetic tape 18 by bit sunchronizers A and B, 19a and 19b, whereat the signal quality of each main and backup track data flow is checked, as indicated by meters 22a and 22b, and that information passed through lines 23 for evaluation, as will be explained later herein, in error detection and correction circuitry 24. Meters 22a and 22b should be understood to be symbolic of apparatus for performing signal quality evaluation and should not be understood to limit such signal quality evaluation to tests performed by a meter only. Rather, signal quality evaluation can include, but is not limited to: track signal amplitude where a drop in amplitude could indicate a tape dropout; proper location of track signal axis crossings where improper crossings could indicate tape dropouts or signal phase anomalies indicative of excessive recorder head wear, not shown, or misaligned tape playback equalization; and number of signal axis crossings where, it is assumed, insufficient crossings can cause a bit synchronizer to lose count of bit periods and the like.

From the bit sync 19a and 19b, the main and backup track information A and B is passed to serial to parallel converters 20a and 20b and sync finder circuitry 21a and 21b that are also connected together. The serial to parallel converters 20a and 20b, reconvert the data to parallel arrangement for passage to a holding register 26a and 26b and simultaneously, to the sync finder 21a and 21b. The sync finder 21a and 21b looks for the presence of proper synchronization codes between data words and information about the presence or absence of the proper synchronization codes is passed to error detection and correction circuitry 24. Sync finder circuitry 21a and 21b in the present invention preferably includes synchronization engine circuitry 40, shown in FIG. 4. At system startup, the synchronization engine 40 utilizes the sync finder to rapidly locate what appears to be a valid synchronization or sync code and will count from that sync code, a certain number of bits, as say the 20 bits per word of the present invention, and will then look for another proper sync code. This process is repeated until either a set number (n) of properly located sync codes are found or a sum of the proper sync codes less erroneous sync codes found equals zero whereupon "sync not found" is declared and the sync finder 21a and 21b is directed to again search to locate a proper sync code.

Further, as part of a preferred data format of the present invention, as will be discussed later herein with respect to FIGS. 3(a) through 3(c), the present invention preferably employs an arrangement for alternating sync coding between each data word for more accurately obtaining synchronization. It should be understood that the alternating sync coding is first recorded on the magnetic tape 18 and is picked up by bit synchronizers 17a and 17b and scanned by sync finders 21a and 21b.

Sync finders 21a and 21b are also connected to main and backup track holding registers A and B, shown at 26a and 26b, that synchronize the two flows for passage to digital delay circuitry 31a and 31b. Also, the data flows from holding registers 26a and 26b, prior to their reaching the digital delay circuitry, are each evaluated by parity check circuitry 27a and 27b, wherein a check is made that a proper parity bit is present in each data word. Information concerning the presence or absence of a proper parity bit in each data word is passed from parity check circuitry 27a and 27b through lines 28 to error detection and correction circuitry 24. Also, prior to the signals reaching digital delay circuitry 31a and 31b, a comparison of the data on the main and backup tracks or A and B tracks, is made at data compare circuitry 29, with information about that comparison passed through line 30 to the error detection and correction circuitry 24.

As detailed above, the present invention tests a data word coming off magnetic tape 18 with four separate error detection tests that include: a signal quality evaluation of each data word on each track, as illustrated by meters 22a and 22b; for proper location of proper synchronization codes between data words by sync finders 21a and 21b; for the presence of proper parity code bits in each data word on both tracks by parity check circuitry 27a and 27b; and for a meter between data words on the main and backup tracks by data comparison circuitry 29. A bad parity or synchronization code error or a data word mismatch constitutes an error that will cause, if the problem is on the main track, a switching to the backup track. A signal quality difference or fluctuation, however, is not treated as an error requiring track switching. Rather, a signal quality difference is treated as indicative of the possibility of an error, and used as a "tie-breaker" in determining, from the other enumerated error detection procedures, which track information is most likely correct. For example, when a mismatch is discovered and the parity and synchronization codes are proper, a signal quality difference will be used to determine which track data is most likely correct. The results of the error detection checks are evaulated by the error detection correction circuitry 24. That circuitry makes a decision as to which data word on main and backup tracks is to be selected as most likely correct for further passage, which decision is passed to date selector circuitry 33, as shown by line 32.

Shown in FIG. 1, main and backup track information is passed through digital delay circuits 31a and 31b prior to the data reaching the data select circuit 33, in which digital delay circuits a delay is created between when a selection determination is made and when the particular data word actually reaches the data selector circuitry 33. Therefore, as shown best in FIG. 2(b), by creating a delay before a problem is sensed on one track, a data selection can be made in anticipation of an error before the particular questionable data word would actually need to be acted upon. FIG. 2(b) shows an illustration of how an error sensed as a parity error in a main track data word causes or triggers selection of, as shown in the lowerline thereof, a number of backup track data words immediately preceding that bad data word. Such early selection of backup track data over main track data assumes, as it has been found in practice, that errors occur in series. Therefore, such early selection anticipates the occurrence of other errors and is to minimize a chance for distortion, to provide for a best possible data reproduction by switching from one track to the other in anticipation of a problem. Further, as errors tend to occur in bursts, as shown best in FIG. 2(a), the data selector circuitry, preferably, on receipt of an error indication through line 32, orders that a data selection decision be held in over a number of following data words to further minimize distortion where, it can be assumed, the track data is just recovering from the problem that caused the error and could be prone to further error. A combination of FIGS. 2(a) and 2(b) is shown in FIG. 2(c) wherein the digital delay circuitry 31a and 31b and data selector circuitry 33 provide both a holding in of an error and selection of backup track data words before and after an error occurs, providing "look behind" and "look ahead" functions to insure a most faithful data reproduction possible. Utilizing this approach, main track data, before a dropout and after one has occurred, is not used. The data selected therefore has a greater likelihood of being correct than was heretofore possible.

Shown in FIG. 1, from the data selector circuitry 33, the selected data word flow passes to a holding register 34 that also receives commands or signals through line 35 from the error detection/correction circuit 24. When and if the holding register 34 is informed by the error detection/correction circuit 24 that a fatal dropout has occurred on both main and backup tracks, and therefore neither main or backup track data is usable, it will hold and pass the last good data word until notified that correct data is available.

From the holding register 34, the signal is passed to a FIFO, or first-in-first-out, buffer memory 36 that is connected, not shown, to the tape drive for controlling speed thereof. So arranged, as will be explained in detail later herein, the FIFO buffer memory 36 controls the tape speed to maintain a certain percentage fullness. That fullness is compared with buffer memory fullness of the other channels, not shown, for synchronizing recording of information recorded on the tape so that it may be played back in synchronization. The preferred arrangement of the buffer memory 35 in conjunction with other buffer memories for providing tape speed control will be discussed in detail later herein with respect to FIG. 5.

As was mentioned earlier herein, the present invention, with respect to FIGS. 3(a) through 3(c) also includes, as a preferred data recording format, alternating synchronization or sync codes to facilitate location and pickup thereof to minimize a potential for an erroneous sync identification. FIG. 3(a) shows a conventional or common digital sync coding arrangement as consisting of a 110 followed by a data word containing also a parity bit. Shown in FIG. 3(b), the data word itself is shown as also containing a 110 that could erroneously be picked up as sync code during startup or recovery from a dropout that would cause a restart of sync locator circuitry and a data loss. FIG. 3(c) shows a preferred sync code arrangement where sync codes are alternated, one after another. So arranged, starting with 110 as the sync code, the following sync code would be 001. In FIG. 3(c), the same false sync signal shown in FIG. 3(b) is repeated, but would not be picked up as a sync code because of the alternating code arrangement of the present invention. Of course, so arranged, the sync finder 21a or 21b will be programmed to pickup the alternating bits as proper sync codes.

As detailed earlier herein with respect to FIG. 1, the sync finders 21a and 21b look for the presence of proper synchronization codes between data words. The present invention, as shown best in FIG. 4, preferably also includes within the sync finder circuitry, circuitry identified hereinafter as sync engine 40. FIG. 4 shows a schematic wherein is detailed the function of that sync engine 40, which circuitry should be understood to consist of arrangements of electronic components that are not in themselves unique, but are unique in combination for performing the functions detailed hereinafter with respect to FIG. 4. Sync engine 40 operates in essentially four states, analyzing each data word from the bit synchronizer and, as illustrated in block 41, looks for any synchronization code therein. As detailed earlier herein, such synchronization code can be alternated as say between 110 and 001 and so the sync engine would preferably provide for searching for alternating sync codes. A locating of a sync code as illustrated at 42 causes a transition to block 43. However, if a sync code is not found, a transition is made back to block 41 to restart looking for any sync code. This may be the result of engine 40 locating a false sync code within the data bits upon startup. The finding of a next sync code causes a transition, via block 44, to block 46 wherein the presence or absence of sync codes are counted by a counter 47. When a number (n) is received, the condition of block 49 is invoked, declaring sync code found and the beginning of playback. If a single bad sync code is encountered, the counting state, the condition of block 41, is invoked, via 51, commanding a restart of the looking for any sync code. So arranged, if a number of bad sync codes are encountered where the sum of the good and bad sync codes equal zero, then the sync engine 40 reverts to looking for any sync code mode, its first state of operation, as illustrated by block 41. If (n) good sync codes are discovered, the fourth state is invoked where normal playback is initiated as illustrated by block 49.

The schematic of FIG. 4 illustrates the four states of operation of the sync engine 40, which sync engine is preferably incorporated within the sync finder 21a and 21b circuitry that has been discussed with respect to FIG. 1. While the described arrangement and functioning of sync engine 40 is preferred it should be obvious that sync finder circuitry could be employed alone and, particularly with the preferred alternating sync format of the present invention, would constitute a satisfactory sync location system. Sync engine 40 therefore provides an improved arrangement for accurately identifying synchronization coding to obtain as faithful a playback of recorded information as possible.

As discussed earlier herein with respect to FIG. 1, a preferred multi-channel digital tape recorder of the present invention includes a first-in-first-out buffer memory 35 for each channel. In FIG. 5 is shown, in schematic, a 4-channel digital tape recorder that includes with each channel first-in-first-out buffer memories 35a, 35b, 35c, and 35d. The FIFO buffer memories 35a through 35d should be taken as being identical to one another, each individually performing the functions described earlier herein for buffer memory 35. Further, it should be understood that the blocks immediately preceding the FIFO buffer memories 35a through 35d represent the logic for each main and backup track for each channel of a four-channel recorder. Each FIFO buffer memory 35a through 35d is shown in FIG. 5 connected through lines 55a through 55d, respectively, to what appear to be meters 56a, 56b, 56c, and 56d. Meters 56a through 56d illustrate that FIFO buffer memory fullness preferably registers or is measured as a digital number. Each FIFO buffer memory is preferably maintained approximately half full and, at that desired half-full level, arrows 57a, 57b, 57c, and 57d of meters 56a through 56d would be at the same mid-point. The present invention provides for an averaging of the fullness levels of the buffer memories, illustrated by arrows 57a through 57d, when a channel has data and is not recording, to increase or decrease tape speed to provide an average half-full level. Thereby, a uniform tape speed is obtained such that playback of the tracks of the different channels can be synchronized, as say for the over-dubbing of one track over another, or like operations. To provide such fullness averaging the digital number from each meter 56a through 56d is passed to appropriate logic circuitry identified as 58a, 58b, 58c, and 58d that are essentially gates that also receive, along with the buffer memory fullness values, signals representing channel recording status and whether the channel is recording. The channel status signals are shown by arrows 60a through 60d that indicate if a particular channel has data thereon. Whether or not the channel is recording is represented by lines 61a through 61d. Assuming the presence of data and that the channel is not in a record mode, the gates 58a through 58d will pass the fullness values of the buffer memory 35a through 35d to an averager as digital numbers. If the channel is recording, the gate will not pass that digital number. The averager 62 provides thereby an average digital number that represents buffer memory fullness for those channels not in a record mode that have data thereon, which average digital number is then converted to a corresponding voltage in a DAC circuit 63. That voltage from the DAC circuit 63 is then passed to a variable frequency oscillator labeled VCO 64 that controls tape speed and passes an appropriate signal through a switch 65 and through a line 66 to a tape speed control drive box 67 to appropriately control tape speed. Should all channels be in a record mode, then no signal is, of course, passed to the averager 62 which condition would cause switch 65 to move to a position where a medium tape speed is commanded by an external oscillator 68.

As per the above, tape speed is controlled by an average buffer memory fullness of tracks with data thereon that are not in a record mode, preventing buffer memories in a record mode from being considered in the averaging. Thereby, new material being recorded on an active channel will not affect the speed of that recording. Rather, the speed of recording of that new material is controlled by data already recorded on another channel. Thereby, a synchronizing or bringing into synchronization of data already recorded with material being recorded is accomplished. So arranged, materials recorded at different times can therefore be brought into synchronization for over-dubbing operations, or the like.

The present invention consists of combinations of circuitry for performing the error detection/correction functions enumerated herein. While the preferred recording format of the present invention involves the inclusion of a parity bit in each data word, which parity bit is then checked in the error detection process, it should be obvious that such parity bit inclusion could be dispensed with within the scope of this disclosure. Obviously, if such parity bit is not included, the error detection arrangement would not look for it, the present invention then including checking for synchronization coding, data match, and for signal quality, only. Further, the present invention includes a synchronization code format for facilitating and insuring that proper sync codes will be identified as early in the playback mode as possible to reduce information loss, which synchronization code format can be used with synchronization engine circuitry that operates in four states to facilitate accurate acquisition of synchronization. Further, the present invention provides circuitry for averaging buffer memory fullness for a plurality of channels to consider only those channels not recording with data thereon whereby existing data controls the recording speed of new material providing for a smooth over-dubbing of information being recorded with information recorded earlier. Also, while a four-channel recorder has been shown to be preferred, it should be understood not to be limited to recorders of any particular numbers of channels.

While preferred embodiments of our invention and methods have been shown and described herein, it should be obvious that this disclosure is made by way of example and variations are possible without departing from subject matter coming within the acope of the following claims, which claims we regard as our invention.

We claim:

1. Apparatus for processing of digital information comprising a multi-channel recorder wherein analog information is converted to digital form and recorded on a permanent media on a plurality of sets of main and backup tracks, each said backup track containing a duplication of the main track information that consists of data words that each contain synchronization codes, said recorder including circuitry for picking up information off said permanent media for playback;

Said multi-channel recorder including:
   means for retrieving each said main and backup track flows;
   means for measuring and comparing the signal quality of each data word in each main and backup track flows;
   means for locating proper synchronization codes in said data words in each said main and backup track flows;
   means for comparing said data words in each said main and backup track flows against one another;

means for receiving and evaluating information from: said means for locating synchronization codes; means for comparing data words; and means for measuring and comparing signal quality, so as to select most likely correct data words from each said main and backup tracks for playback; and playback means for converting selecting digital information back to analog form for playback.

2. Apparatus for processing digital information as recited in claim 1, wherein each data word includes a parity bit therein, and further including means for identifying proper parity codes in data words in each main and backup track flow; and the means for receiving and evaluating information is connected to receive information from said means for identifying proper parity codes and to use that information in determining most likely correct information.

3. Apparatus for processing digital information as recited in claim 1, further including, delay means arranged with the multi-channel recorder to simultaneously process both main and backup tracks for providing a delay into the data flows whereby a selection of most likely correct information can be made by the means for receiving and evaluating information and, as necessary, a track switching can be made in anticipation of a sensed error.

4. Apparatus for processing digital information as recited in claim 3, wherein the means for receiving and evaluating information also provides for continuing to play back data off from the switched track after sensing an error for a number of data words in the flow after a data word is identified as being in error.

5. Apparatus for processing digital information as recited in claim 1, further including a holding register means arranged with the multi-channel recorder to simultaneously process both main and backup tracks for holding and duplicating for playback a last good data word where the means for receiving and evaluating information is unable to identify a following most likely correct data word from those on the main and backup tracks.

6. Apparatus for processing digital information as recited in claim 1, further including a first-in-first-out buffer memory means arranged with the multi-channel recorder to simultaneously process both main and backup tracks to receive the flow of most likely correct data words from the means for recording and evaluating information for providing a constant output therefrom for playback; and means for controlling tape speed arranged with the multi-channel recorder and connected to a means for measuring buffer memory fullness to maintain a desired first-in-first-out buffer memory fullness.

7. Apparatus for processing digital information as recited in claim 6, further including a first-in-first-out buffer memory means for each channel of a multi-channel recorder;

means for averaging said buffer memory means fullness that is connected to each said means for measuring said buffer memory means fullness and to the means for controlling tape speed; and means for limiting the averaging of said buffer memory means fullness to those channels with data thereon and not recording.

8. Apparatus for processing digital information as recited in claim 7, further including switch means whereby, when all channels are recording, the means for controlling tape speed will be operated at a medium speed.

9. Apparatus for processing digital information as recited in claim 7, wherein the averaged buffer memory means fullness is reflected as a voltage passed to an oscillator means for controlling tape speed.

10. A method for providing improved error detection and correction of digital information recorded on a recording media as a flow of data words duplicated on main and backup tracks that include synchronization code bits with each data word of each track, for identifying erroneous data words on each track, including the steps of, checking and comparing the signal quality of each data word on said main track with the complement data word on said backup track;

checking for the presence of a proper synchronization code in each data word on each track;

checking for a match between complementary data words on main and backup tracks; and analyzing the results of the checks to determine most likely correct data for passage for playback.

11. A method for providing improved error detection and correction of digital information as recited in claim 10, wherein analyzing the results of the checks includes, identifying a data word that fails a check for proper synchronization code as being in error;

identifying the existence of an error when main and backup tracks data words fail to match; and comparing a difference in signal quality main and backup track data words with said other erroneous data word indicators to select a most likely correct data word.

12. A method for providing improved error detection and correction of digital information as recited in claim 10, in data words containing parity bits further including, checking for the presence of a proper parity bit in each data word on each track; and evaluating the results of that parity check with the other checks to determine most likely correct data words for playback.

13. A method for providing improved error detection and correction of digital information as recited in claim 12, wherein analyzing the results of the four checks includes, identifying a data word that fails a check for proper parity code as being in error;

identifying a data word that fails a check for proper synchronization code as being in error;

identifying the existence of an error when main and backup tracks data words fail to match; and comparing a difference in signal quality between main and backup track data words with said other erroneous data word indicators to select a most likely correct data word.

14. A method for providing improved error detection and correction of digital information as recited in claim 10, further including, providing a delay between the determination of the presence of an erroneous data word and a selection of which data word on the main and backup tracks to pass for playback; and identifying a number of data words coming before the erroneous data word as being in error to effect a selection of other track data words for passage for playback.

15. A method for providing improved error detection and correction of ditigal information as recited in claim 10, further including:

providing a delay between the determination of the presence of an erroneous data word and a selection of which data word on the main and backup tracks to pass for playback; and identifying a number of data words following the erroneous data word as being in error to effect a selection of other track data words for passage for playback.

* * * * *